Sept. 11, 1956  C. A. PETERSON ET AL  2,762,914
TRIGGER SIGNAL CONVERTER
Filed March 2, 1953
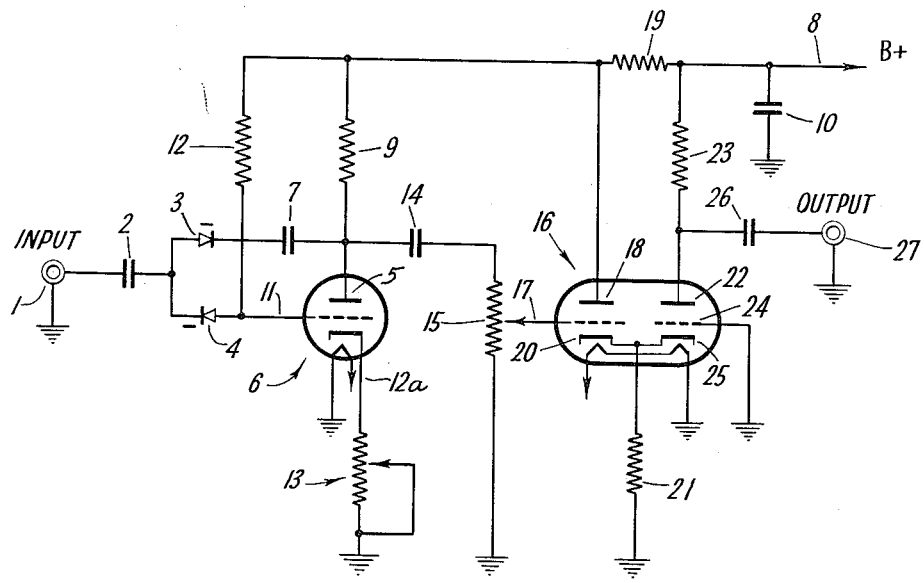
INVENTOR
WILLIAM M. CLAPP
CARL A. PETERSON
BY Michael Hertz
ATTORNEY

United States Patent Office 2,762,914
Patented Sept. 11, 1956

2,762,914

TRIGGER SIGNAL CONVERTER

Carl A. Peterson, Smethport, and William M. Clapp, Emporium, Pa., assignors to Sylvania Electric Products Inc., a corporation of Massachusetts Application March 2, 1953, Serial No. 339,832

13 Claims. (Cl. 250—27)

This invention relates to means for converting one form of signal to another.

It is an object of the invention to convert pulses which have a sharp rise and fall into trigger pulses wherein all the trigger pulses have the same polarity and the trigger pulses correspond to both the rise and the fall of the signal.

It is a further object of the invention to convert signal waveforms, having a sharp rise and fall, regardless of polarity or precise shape of the signal, into trigger pulses all of the same polarity, the trigger pulses corresponding both to the rise and to the fall of the wave.

It is a further object of our invention to convert square waves into trigger pulses, with both the oncoming front and trailing end of the wave converted into a trigger pulse, all pulses being of the same polarity.

It is a still further object to effect this conversion by the use of a very simple circuit which is not critical of the values of the components utilized in the converter circuit.

Other objects will be apparent after reading the specification in connection with the accompanying figure which represents our novel converter circuit in connection with an amplifier.

In the figure there is represented an input jack 1, the outer side of which is grounded and the shielded end of which is connected to a condenser 2. The other end of the condenser is connected to two rectifiers 3 and 4 which may be of any type, preferably of the crystal type. The rectifier 3 is arranged with its positive end presented to the condenser while the rectifier 4 is in reverse position. The negative end of rectifier 3 is connected to the plate 5 of a triode 6 via a blocking condenser 7. A D. C. supply lead 8 from the B+ of a supply is connected to the plate 5, there being, individual to the triode, a resistance element 9 in the lead. Preferably the supply is well regulated and an additional filter condenser 10 may be employed. The condenser 2 is small while the condenser 7 is comparatively large. The signal pulse that will reach the plate can only be in the positive phase because of the interposition of the rectifier 3 between the signal source and the plate.

The positive end of the rectifier 4 is connected to the grid 11 of the triode. The grid is also fed by the same D. C. source as feeds the plate but through a resistor 12 of large value. When a signal in the negative phase appears at the input, the crystal 4 allows conduction thereof and such a pulse appears at the grid of the triode.

The cathode 12a of the triode is grounded via a balance control potentiometer 13 whose function will be later described, this potentiometer being more or less shunted by its variable control arm.

The A. C. component of the output of the triode is fed via a coupling condenser 14 and potentiometer 15 to a cathode coupled grounded grid amplifier 16. The potentiometer is connected at its free end to ground. The input to the grid 17 of the cathode follower is by way of the potentiometer arm. The plate 18 of the amplifier is fed from the D. C. source via a resistor 19 and the cathode is connected to ground via a biasing resistor 21. The amplifier comprises a triode having a plate 22 fed from the D. C. source via a resistor 23, a grounded grid 24, and the cathode 25. The cathode 25 is connected to or forms part of the cathode 20. The A. C. component of the voltage appearing at the plate 22 is coupled via a condenser 26 to the output jack 27, the sleeve of which is grounded. The cathodes in both of the tubes although shown as indirectly heated may obviously be directly heated cathodes of the filamentary type.

The first amplifier tube 6, it will be noted, has its grid at high potential whereby the tube operates under saturated conditions.

As an example of how the converter operates, consider the application of a square wave thereto. Such a wave will by action of the converter produce two positive trigger pulses, one corresponding to the leading edge and one corresponding to the trailing edge of the wave. Regardless of whether the pulses fed into the converter are positive or negative, the trigger pulses will always be positive. As an example, when a negative square wave is received, the leading edge, by differentiation in the network connected to the grid 11, will momentarily make the grid less positive with a consequent decrease in plate current and increase of voltage at the plate. Thus at the plate there will be produced a positive trigger pulse. The pulse produced by the trailing edge of the same square wave will be differentiated by the plate connected network and since this pulse is positive it will also produce an increase of voltage at the plate 5. It can be seen that even if the wave were positive the leading and trailing edges would still produce two trigger pulses, each positive at the plate. In order to equalize the magnitude of the pulses, the arm of the potentiometer 13 may be shifted, as desired.

As is clear from the previous description, these positive trigger pulses are capacity coupled to the combined cathode follower and grounded grid amplifier 16. The gain of the converter unit may be controlled by displacement of the arm of the potentiometer 15.

The output of the converter may be utilized, for example, by applying the same to an oscilloscope as a trigger supply therefor.

By way of example only, since the choice of tubes and values of condensers and resistors as well as voltages are not critical, the following values and components may be used:

| | |
|---|---|
| Voltage supply for plates | 105 v. regulated. |
| Tube 6 | 6C4. |
| Tube 16 | 6J6. |
| C 2 | 10 mmfd. |
| C 7 | .002 mfd. |
| C 10 | .01 mfd. |
| C 14 | .01 mfd. |
| C 26 | .01 mfd. |
| R 9 | 100K ohms. |
| R 12 | 1 megohm. |
| R 19 | 680 ohms. |
| R 21 | 100 ohms. |
| R 23 | 10K ohms. |
| Potentiometer 13 | 3K ohms. |
| Potentiometer 15 | 50K ohms. |
| Rectifiers 3, 4 | Sylvania type 1N60. |

Having thus described our invention, what we claim is:

1. A signal converter comprising a triode associated with plate and grid circuits, a phase differentiating network connected to its plate circuit, a second phase differentiating network connected to the grid, means for feeding a signal having a steep positive phase and a steep negative phase to said networks, means in said first network to limit the application of voltage from said signal to said plate circuit so that only voltage in one of said phases may reach the same, means in said second network to limit the application of voltage from said signal to said grid so that only voltage in the other of said phases may reach the same, and means for removing from the plate circuit the trigger pulses created by the application of the signal to the triode.

2. A signal converter comprising a triode associated with plate and grid circuits, a phase differentiating network connected to its plate circuit, a second phase differentiating network connected to the grid, means for feeding a signal having a steep positive phase and a steep negative phase to said networks, said grid, for all applications of signal applied thereto, being well biased into the positive region, means in said first network to limit the application of voltage from said signal to said plate circuit so that only voltage in one of said phases may reach the same, means in said second network to limit the application of voltage from said signal to said grid so that only voltage in the other of said phases may reach the same, and means for removing from the plate circuit the trigger pulses created by the application of the signal to the triode.

3. A signal converter comprising a triode associated with plate and grid circuits, a phase differentiating network connected to its plate circuit, a second phase differentiating network connected to the grid, means for feeding a signal having a steep positive phase and a steep negative phase to said networks, said grid, for all applications of signal applied thereto, being well biased into the positive region, means in said first network to limit the application of voltage from said signal to said plate circuit so that only voltage in one of said phases may reach the same, means in said second network to limit the application of voltage from said signal to said grid so that only voltage in the other of said phases may reach the same, means for removing from the plate circuit the trigger pulses created by the application of the signal to the triode, and means in one of the circuits to equalize the magnitude of the trigger pulses.

4. A signal converter comprising a triode associated with plate and grid circuits, a phase differentiating network connected to the plate of the triode, a second phase differentiating network connected to the grid of the triode, means for feeding a signal having a steep positive phase and a steep negative phase to said networks, means in said first network to limit the application of voltage from said signal to said plate circuit so that only voltage in the positive phase may reach the same, means in said second network to limit the application of voltage from said signal to said grid so that only voltage in the negative phase may reach the same and means for removing from the plate circuit the trigger pulses created by the application of the signal to the triode.

5. A signal converter comprising a triode associated with plate and grid circuits, a phase differentiating network connected to the plate of the triode, a second phase differentiating network connected to the grid of the triode, means for feeding a signal having a steep positive phase and a steep negative phase to said networks, means in said first network to limit the application of voltage from said signal to said plate circuit so that only voltage in the positive phase may reach the same, means in said second network to limit the application of voltage from said signal to said grid so that only voltage in the negative phase may reach the same, means for removing from the plate circuit the trigger pulses created by the application of the signal to the triode, and a variable resistor connected to the cathode to equalize the trigger pulses.

6. A signal converter comprising a triode associated with plate and grid circuits, a phase differentiating network connected to the plate of the triode, a second phase differentiating network connected to the grid of the triode, said networks having at least one differentiating portion in common, means for feeding a signal having a steep positive phase and a steep negative phase to said networks, means in said first network to limit the application of voltage from said signal to said plate circuit so that only voltage in the positive phase may reach the same, means in said second network to limit the application of voltage from said signal to said grid so that only voltage in the negative phase may reach the same, means for removing from the plate circuit the trigger pulses created by the application of the signal to the triode, and a variable resistor connected to the cathode to equalize the trigger pulses.

7. A signal converter comprising a triode associated with plate and grid circuits, means for supplying a high positive voltage to the plate and to the grid such as to cause a large flow of current through the tube, means for conducting a signal having a steep wave front and a steep trailing edge to the plate and to the grid comprising a rectifier in each of the connections to the plate and to the grid, the rectifier to the plate being so arranged as to conduct only positive pulses thereto and the rectifier to the grid being so arranged as to conduct only negative pulses thereto, and means for picking off the resultant trigger pulses, all positive, from the plate.

8. A signal converter comprising a triode associated with plate and grid circuits, means for supplying a high positive voltage to the plate and to the grid such as to cause a large flow of current through the tube, means for conducting a signal having a steep wave front and a steep trailing edge to the plate and to the grid comprising a rectifier in each of the connections to the plate and to the grid, the rectifier to the plate being so arranged as to conduct only positive pulses thereto and the rectifier to the grid being so arranged as to conduct only negative pulses thereto, a variable resistor in the plate circuit connected to the cathode, and means for picking off the resultant trigger pulses, all positive, from the plate.

9. A signal converter for converting signals having positive and negative phases into pulses all of the same phase, said converter comprising a triode, means including a load resistor feeding a direct current potential to the plate of said triode, means supplying a positive potential to said grid sufficient to establish a substantially saturated condition of the tube, means for feeding the positive phase of said signal to the plate including a rectifier with its cathode end directed toward the plate, a condenser between the rectifier and the plate, means for feeding the negative portion of said signal to said grid including a second rectifier with its anode connected to the grid and its cathode end connected to a signal input member, and means for conducting away from the plate the resultant trigger pulses, all of which are positive.

10. A signal converter for converting signals having positive and negative phases into pulses all of the same phase, said converter comprising a triode, means including a load resistor feeding a direct current potential to the plate of said triode, means supplying a positive potential to said grid sufficient to establish a substantially saturated condition of the tube, means for feeding the positive portion of a signal to the plate including a rectifier with its cathode end directed toward the plate, a condenser between the rectifier and the plate, a signal input member, a second condenser between the rectifier and the signal input member, means for feeding the negative portion of said signal to said grid including a second rectifier with its anode connected to the grid and its cathode end connected to the signal input member, said second condenser also being interposed between the input member and the second rectifier, and means for conducting away from the plate the resultant trigger pulses, all of which are positive.

11. A signal converter for converting signals having positive and negative phases into pulses all of the same phase, said converter comprising a triode, means including a load resistor feeding a direct current potential to the plate of said triode, means supplying a positive potential to said grid sufficient to establish a substantially saturated condition of the triode, means for feeding the positive portion of a signal to the plate including a rectifier with its cathode end directed toward the plate, a condenser between the rectifier and the plate, means for feeding the negative portion of said signal to said grid including a second rectifier with its anode connected to the grid and its cathode end connected to a signal input member, a variable resistor in the plate circuit connected to the cathode of said triode, and means for conducting away from the plate the resultant trigger pulses, all of which are positive.

12. A signal converter for converting signals having positive and negative phases into pulses all of the same phase, said converter comprising a triode, means including a load resistor feeding a direct current potential to the plate of said triode, means supplying a positive potential to said grid sufficient to establish a substantially saturated condition of the triode, means for feeding the positive portion of a signal to the plate including a rectifier with its cathode end directed toward the plate, a condenser between the rectifier and the plate, a signal input member, a second condenser between the rectifier and the signal input member, means for feeding the negative portion of said signal to said grid including a second rectifier with its anode connected to the grid and its cathode end connected to the signal input member, said second condenser also being interposed between the input member and the second rectifier, a variable resistor in the plate circuit connected to the cathode of said triode, and means for conducting away from the plate the resultant trigger pulses, all of which are positive.

13. A signal converter for converting waveforms having a steep front and a steep trailing edge into trigger pulses corresponding to said front and trailing edge and all of which pulses are positive, comprising an input jack for the signal, one side of the jack being grounded, a condenser connected to an ungrounded portion of the jack, two crystal rectifiers in series relation to the condenser but in parallel to one another, one rectifier being presented with its anode to the condenser and the other in reverse relation, the cathode end of the first rectifier being connected to a second condenser, said second condenser being connected to the plate of a triode, the second rectifier having its anode connected to the grid of the triode, a load resistor connected at one end to the plate, means having one end grounded supplying power to the other end of said resistor, a second resistor connected at one end to the grid, said power supply means applying potential to the other end of the resistor sufficient to permit a heavy current flow through the triode, a variable resistor between the cathode of the triode and ground and means connected to the plate to conduct away therefrom the resultant trigger pulses.

References Cited in the file of this patent
UNITED STATES PATENTS

| | | |
|---|---|---|
| 2,470,028 | Gordon | May 10, 1949 |
| 2,537,589 | Johnson | Jan. 9, 1951 |
| 2,572,080 | Wallace | Oct. 23, 1951 |
| 2,589,860 | Pike | Mar. 18, 1952 |